United States Patent [19]

Mitchell

[11] Patent Number: 5,584,893

[45] Date of Patent: Dec. 17, 1996

[54] METHOD OF PREPARING ELECTRODES FOR AN ELECTROCHEMICAL CELL

[75] Inventor: Porter H. Mitchell, Las Vegas, Nev.

[73] Assignee: Valence Technology, Inc., Henderson, Nev.

[21] Appl. No.: 559,121

[22] Filed: Nov. 17, 1995

[51] Int. Cl.$^6$ .................................................. H01M 10/38
[52] U.S. Cl. ........................................ 29/623.5; 429/192
[58] Field of Search ............................. 29/623.5; 429/192

[56] References Cited

U.S. PATENT DOCUMENTS 5,219,680  6/1993  Fauteux .................................... 429/192
5,514,492  5/1996  Marincic et al. ....................... 429/194

*Primary Examiner*—John S. Maples
*Attorney, Agent, or Firm*—Charles Jew

[57] ABSTRACT

A method of preparing an electrochemical cell wherein the electrode material adheres to the current collector to create good electrical contact is provided. A critical aspect in the process of preparing the polymer mixture for both the anode and cathode slurries is that the polymer (or copolymer) not be subject to high shear so as to be degraded. Polymer degradation contributes to the creation of the polymer concentration gradient in the electrode film.

20 Claims, No Drawings

METHOD OF PREPARING ELECTRODES FOR AN ELECTROCHEMICAL CELL

FIELD OF THE INVENTION

The present invention relates to electrochemical devices and, more particularly, to non-aqueous electrochemical cells demonstrating improved performance.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active cathode material of the cathode where the ions are taken up with the simultaneous release of electrical energy. During charging, the flow of ions is reversed so that lithium ions pass from the electrochemically active material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

Current collectors are used with carbon anodes and cathodes as described, for example, in U.S. Pat. Nos. 4,925,752 and 5,011,501. In fabricating cathodes for instance, a cathode material comprising a solvent, polymer, and electrochemically active particulate material is laminated to a current collector. Thereafter, the solvent is allowed to evaporate to form a sheet of cathode material on the current collector. Unfortunately, prior art anode and cathode materials often do not adhere adequately to the surface of the current collector which reduces the electrochemical performance of the electrochemical cell.

SUMMARY OF THE INVENTION

The present invention is based in part on the discovery that improved anodes and cathodes can be fabricated by increasing the homogeneity of the anode and cathode slurries and by minimizing the degree of polymer degradation in the slurry during the mixing processes prior to casting. Anode and cathode slurries so prepared produce anode and cathode materials which adhere well to the current collector thus creating good electrical contact.

In one aspect, the invention is directed to a method of preparing an electrochemical cell comprising the steps of:

(a) preparing an anode mixture comprising a first polymer, an intercalation carbon material, and a first inert liquid solvent wherein the first polymer is homogeneously distributed within said anode mixture;

(b) evaporating the first inert liquid solvent from the anode mixture to form an anode film;

(c) preparing a cathode mixture comprising a second polymer, a cathode active material, and a second inert liquid solvent wherein the second polymer is homogeneously distributed with said cathode mixture;

(d) evaporating the second liquid solvent from the cathode mixture to form a cathode film;

(e) forming an anode by laminating said anode film onto at least one side of an anode current collector;

(f) forming a cathode by laminating said cathode film onto at least one side of a cathode current collector;

(g) interposing a polymeric layer between said anode and cathode;

(h) placing an electrolyte solution comprising an electrolyte solvent and an inorganic salt into said anode, cathode, and polymeric layer.

In another aspect, the invention is directed to a method of preparing an electrochemical cell comprising the steps of:

(a) preparing an anode mixture comprising a first polymer, an intercalation carbon material, and a first inert liquid solvent wherein the first polymer is homogeneously distributed within said anode mixture;

(b) coating the anode mixture onto at least one side of an anode current conductor layer to form an anode;

(c) preparing a cathode mixture comprising a second polymer, a cathode active material, and a second inert liquid solvent wherein the second polymer is homogeneously distributed with said cathode mixture;

(d) coating the cathode mixture onto at least one side of a cathode current collector layer to form a cathode;

(c) interposing a polymeric layer between said anode and cathode;

(d) removing said first and second inert liquid solvents; and (e) placing an electrolyte solution comprising an electrolyte solvent and an inorganic salt into said anode, cathode, and polymeric layer.

In yet another aspect, the invention is directed to an electrochemical cell comprising:

an anode having anode current collector and a film of anode material laminated on at least one side of the anode current collector, wherein the anode material comprises a first polymer that is homogeneously distributed in the film;

a cathode having cathode current collector and a film of cathode material laminated on at least one side of the cathode current collector, wherein the cathode material comprises a second polymer that is homogeneously distributed in the film;

a polymeric layer interposed between the anode and cathode and which comprises an electrolyte solution comprising an electrolyte solvent and an inorganic salt.

A critical aspect in the process of preparing the polymer mixture for both the anode and cathode slurries is that the polymer (or copolymer) not be subject to high shear so as to be degraded. It is believed that polymer degradation contributes to the creation of a polymer concentration gradient in the electrode film. Degradation also contributes to poor physical property performance

DETAILED DESCRIPTION OF THE PREFERRED EMBODIMENTS OF THE INVENTION

The present invention is directed to a method of preparing electrodes suitable for use in electrochemical devices. The invention is based in part on the discovery that prior art casting techniques produce electrodes wherein the polymer is not uniformly distributed therein. It was found that the solvent drying process caused polymer molecules to be transported toward the surface of the electrode slurry thereby creating a polymer concentration gradient within the electrode. Specifically, after the solvent has evaporated, the polymer concentration is highest near the exposed surface of the electrode film. Since the polymer functions in part to bind the electrode to the surface of the current collector, the result was poor adhesion and a reduction in electrical contact. Furthermore, the concentration gradient within the electrode reduced the cohesiveness of the electrode itself.

Preferred cells include: a cathode comprising an active material, an intercalation based carbon anode, with each electrode capable of reversibly incorporating (i.e., intercalating) an alkali metal ion, and a polymeric matrix containing an electrolyte solution comprising an organic electrolyte solvent and a salt of the alkali metal. Each electrode has a current collector. Particularly preferred electrochemical cells and batteries use lithium and salts thereof.

The anode of the present invention generally comprises an anode film that is laminated onto one or both sides of the current collector which is a thin metal foil or grid. Typically, each anode film is from about 100 µm to about 250 µm in thickness, preferably about 110 µm to about 200 µm, and more preferably about 125 µm to about 175 µm Similarly, the cathode of the present invention generally comprises a cathode film that is laminated onto one or both sides of the current collector which is a thin metal foil or grid. Typically, each cathode film is from about 100 µm to about 200 µm in thickness, preferably about 130 µm to about 175 µm, and more preferably about 140 µm to about 165 µm.

The anode and cathode each also includes a current collector that comprises, for example, a screen, grid, expanded metal, woven or non-woven fabric or knitted wire formed from an electron conductive material such as metals or alloys. Preferably, the current collector has a thickness from about 25 µm to about 75 µm, preferably about 35 µm to about 65 µm, and more preferably about 45 µm to about 55 µm. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by dense gases. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and polymeric matrix. The anode and/or cathode may each include a current collector.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the an and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluroide and hexafluoropropylene dissolved in acetone or other suitable solvent. Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-α-$MnO_2$ ($0\leq y<1$) which is $Li_yNH_4Mn_8O_{16}$ ($0\leq y<1$) which has a hollandite-type structure. $Li_y$-α-$MnO_2$ where $0\leq y<0.5$ is preferred. α$MnO_2$ can be synthesized by precipitation from a reaction between a $MnSO_4$ solution and $(NH_4)_2S_2O_8$ as an oxidizing agent.

Lithiation (also referred to as "prelithiation) of α$MnO_2$ can be accomplished via a solid state reaction:

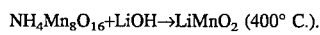

$NH_4Mn_8O_{16}+LiOH\rightarrow LiMnO_2$ (400° C.).

Li-α-$MnO_2$ retains the same structure as Hollandite. See, Botkovitz et. al., J. of Power Sources, 43–44 (1993) 657–665, which is incorporated herein, for a discussion of the structure and electrochemical characteristics of Li-α-$MnO_2$. $Li_y$-α-$MnO_2$ $0\leq y<0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100, 000. Preferably, the film forming agent is employed in an amount of about 1 to about 10 weight percent and more preferably at about 2.5 weight percent based on the total weight of the electrolyte composition.

Methodology

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive method can be adapted to form anode, cathode, and/or polymeric matrix structures in prior art electrochemical cells. The following illustrates a method of how an electrolytic cell could be fabricated with the inventive process. Examples 1 and 2 describe the process of preparing the anode and cathodes, respectively. Example 3 describes the procedures for fabricating a solid electrolytic cell.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

The anode current collector employed was a sheet of expanded copper metal that is about 50 μm thick. It is available under the designation Delker #2 Cu5-125 (flatten) Delker, Branford, Conn.

The anode slurry was prepared as follows:

A polymer mixture comprising a copolymer of polyvinylidenedifluoride (PVDF) and hexafluoropropylene (HFP) was prepared by mixing 23.3 grams of the copolymer in 100 ml of acetone. The copolymer (ave. melt viscosity 23,000–27,000 poise) was Kynar Flex 2801™ from Elf Atochen North America, Philadelphia, Pa. The mixture was stirred for about 24 hours in a milling jar available from VWR Scientific, San Francisco, Calif., catalogue No. H-04172-00. The copolymer functions as a binder for the carbon in the anode.

A graphite mixture was prepared separately by first adding 80 grams of graphite into 3.1 grams of carbon black into a solution containing 200 grams acetone, 36 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willbroeck, Belgium. Preferred surfactants include pluronic FC68™ from BASF, Mr. Olive, N.J. and Fluorad 430™ from 3M Co. St. Paul, Minn. The surfactant disperses the graphite. The graphite mixture was then vigorously mixed in a high shear mixer until a substantially homogeneous blend was formed. A suitable mixer is available from Ross, Model ME100DLX, Hauppauge, N.Y. operating at a high setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 μm thick. The aluminum grid is available under the designation 2AL5-077 from Delker, Brandford, Conn.

The cathode slurry was prepared as follows:

A polymer mixture comprising a copolymer of polyvinylidenedifluoride (PVDF) and hexafluoropropylene (HFP) was prepared by mixing 26.7 grams of the copolymer in 100 grams of acetone. The copolymer was Kynar Flex 2801™. The mixture was stirred for about 24 hours in a milling jar.

An active material mixture was prepared separately by first adding 173.4 grams of a cathode-active material blend of $Li_xMn_2O_4$ (spinel) ($0<x\leq2$) and $Li_y\text{-}\alpha\text{-}MnO_2$ ($0\leq y<1$) (1:1 weight ratio), 14.7 grams of carbon black (Super P™) into a solution containing 333.3 grams acetone, 51.9 grams dibutyl phthalate, and 0.9 grams of a surfactant. The mixture was then vigorously mixed in the a high shear mixer until a substantially homogeneous blend was formed.

The cathode slurry was prepared by mixing the polymer mixture and the $Li_xMn_2O_4$ mixture together under low shear conditions to form the anode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which impart toughness and strength to the film. In addition, it is believed that the $SiO_2$ assists the activation process by creating phyico-chemical conditions such that the electrolyte solution quickly and completely fills the pores created by the extraction of the dibutyl phthalate. Preferably, the polymeric slurry is mixed under low shear conditions as not to degrade the copoloymer. The precursor is then packaged in moisture-impermeable material which is described, for example, in U.S. Pat. No. 5,326,653 which is incorporated herein.

A critical aspect in the process of preparing the polymer mixture for both the anode and cathode slurries is that the polymer (or copolymer) not be subject to high shear so as to be degraded. It is believed that polymer degradation contributes to the creation of the polymer concentration gradient in the electrode film. Furthermore, preferably the polymer or copolymer employed has a high average molecular weight. Preferably the average molecular weight is between 50K to 750K, more preferably 200K to 500K, and most preferably 250K to 300K. Furthermore, it is preferred that polymer or copolymer has a narrow molecular weight range. Preferably $M_n/M_w \cong 1.0$.

Next, the dibutyl phthalate plasticizer is extracted from the precursor before being activated. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. Following extraction, the precursor is first pre-packaged in moisture impermeable material described, for example, in U.S. Pat. No. 5,326,653 which is incorporated herein and then activated. Activation preferably takes place in an inert (e.g., argon) atmosphere. Finally, the packaging is sealed and the electrochemical cell is ready for use.

EXPERIMENTAL

Sample electrode films were prepared by coating electrode slurries onto different substrate surfaces and the resulting electrode films were subjected to EDX analyses. The electrodes slurries initially comprised 58.4% acetone, 10.5% dibutyl phthalate, 6.8% polyvinylidene fluoride (ave. MW 120K), and 24.3% graphite, with all percentages by weight. For Example 4, the slurries were mixed together in a Waring Blender under high shear conditions. Specifically, acetone and dibutyl phthalate were added to the stainless steel container. Then approximately ⅓ of the graphite was added and the blender turned on for approximately 30 seconds. The remaining graphite was added in 2 sequential additions followed by 30 seconds of mixing. After the last addition, the mixture was allowed to mix for 30 minutes, at the lowest level of blender speed (approximately 9K RPM). Thereafter, the slurries were casted onto a glass substrate and the acetone was allowed to evaporate under ambient conditions. For Example 5, the slurry was prepared by the inventive method wherein the polymer mixture was blended separately under low shear conditions.

EDX analyses were performed with a 10 KV electron beam with a Cambridge model 360 Stereoscan SEM equipped with PGT-4Plus EDX analyzer (with light element detection capability). Carbon and fluorine ratios were obtained from the top (exposed to atmosphere) and bottom (in contact with substrate) surfaces and from several other locations in the longitudinal cross-sections of the films. Each EDX spectrum was acquired for 100 sec. and then the background corrected, integrated counts within the C and F peaked used to compute the C/F ratios. Since the only source of fluorine is the polymer, the C/F ratio indicates the relative polymer concentration in the film at the location of analysis. The higher the C/F ratio, the lower the polymer concentration.

As is apparent, in Example 4 the C/F ratio was lowest at the top surface and highest at the bottom surface. This suggests that a significant polymer concentration gradient was present within these films. The concentration gradient was not seen in the film of Example 5. The subsequent extraction of the plasticizer does not affect the concentration gradient.

Based on this comparative data, it is believed that with the inventive process electrode (both anode and cathode) films can be fabricated wherein the polymer concentration at the top and bottom surfaces is substantially the same.

EXAMPLE 4

| analysis location | total film thickness is 210.0 μm | |
|---|---|---|
| | distance from top (μM) | C/F ratio |
| top surface | — | 3.48 |
| A | 5.0 | 5.54 |
| B | 28.3 | 7.75 |
| C | 55.7 | 8.12 |
| D | 85.6 | 8.46 |
| E | 115.0 | 9.72 |
| F | 141.0 | 10.30 |
| G | 170.0 | 10.44 |
| H | 203.0 | 11.15 |
| bottom surface | — | 12.30 |

EXAMPLE 5

| analysis location | total film thickness is 100.0 μm | |
|---|---|---|
| | distance from top (μM) | C/F ratio |
| top surface | — | 6.57 |
| A | 5.0 | 6.57 |
| B | 27.1 | 7.36 |
| C | 49.1 | 7.67 |
| D | 68.1 | 8.05 |
| E | 94.6 | 6.69 |
| bottom surface | — | 6.41 |

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrochemical cell comprising the steps of:
   (a) preparing an anode mixture comprising a first polymer, an intercalation carbon material, and a first inert liquid solvent wherein the first polymer is homogeneously distributed within said anode mixture;
   (b) evaporating the first inert liquid solvent from the anode mixture to form an anode film;
   (c) preparing a cathode mixture comprising a second polymer, a cathode active material, and a second inert liquid solvent wherein the second polymer is homogeneously distributed with said cathode mixture;
   (d) evaporating the second liquid solvent from the cathode mixture to form a cathode film;
   (e) forming anode by laminating said anode film onto at least one side of an anode current collector;
   (f) forming a cathode by laminating said cathode film onto at least one side of a cathode current collector;
   (g) interposing a polymeric layer between said anode and cathode;
   (h) placing an electrolyte solution comprising an electrolyte solvent and an inorganic salt into said anode, cathode, and polymeric layer.

2. The method of claim 1 wherein the anode mixture, cathode mixture, and polymeric layer each further comprises a plasticizer and said method further comprises the step of removing said plasticizer before step (e).

3. The method of claim 1 wherein the step of preparing the anode mixture comprises the steps of:

(i) mixing the first polymer and a portion of said first inert liquid solvent under low shear conditions;

(ii) mixing the intercalation carbon material and a portion of said first inert liquid solvent; and (iii) mixing the mixtures of steps (i) and (ii) under low shear conditions; and wherein the step of preparing the cathode mixture comprises the steps of:

(iv) mixing the first polymer and a portion of said second inert liquid solvent under low shear conditions;

(v) mixing the cathode active material and a portion of said first inert liquid solvent; and (vi) mixing the mixtures of steps (iv) and (v) under low shear conditions.

4. The method of claim 1 wherein the anode mixture, cathode mixture, and polymeric layer each further comprises a plasticizer and said method further comprises the step of removing said plasticizer prior to step (h), wherein the step of preparing the anode mixture comprises the steps of:

(i) mixing the first polymer and a portion of said first inert liquid solvent under low shear conditions;

(ii) mixing the intercalation carbon material, plasticizer, and a portion of said first inert liquid solvent; and (iii) mixing the mixtures produced in steps (i) and (ii) under low shear conditions; and wherein the step of preparing the cathode mixture comprises the steps of:

(iv) mixing the first polymer and a portion of said second inert liquid solvent under low shear conditions;

(v) mixing the cathode active material, plasticizer, and a portion of said first inert liquid solvent; and (vi) mixing the mixtures produced in steps (iv) and (v) under low shear conditions.

5. The method of claim 1 wherein said first and second polymers comprise polyvinylidenedifluoride.

6. The method of claim 1 wherein said first and second solvents comprise acetone.

7. The method of claim 2 wherein said plasticizer comprises dibutyl phthalate.

8. The method of claim 1 wherein each of said anode mixture and cathode mixture further comprise an electrically conductive material and a surfactant.

9. The method of claim 1 wherein the polymeric layer comprises polymeric matrix and third inert liquid solvent, said third inert liquid solvent being removed prior to step (h).

10. A method of preparing an electrochemical cell comprising the steps of:

(a) preparing an anode mixture comprising a first polymer, an intercalation carbon material, and a first inert liquid solvent wherein the first polymer is homogeneously distributed within said anode mixture;

(b) coating the anode mixture onto at least one side of an anode current conductor layer to form an anode;

(c) preparing a cathode mixture comprising a second polymer, a cathode active material, and a second inert liquid solvent wherein the second polymer is homogeneously distributed with said cathode mixture;

(d) coating the cathode mixture onto at least one side of a cathode current collector layer to form a cathode;

(e) interposing a polymeric layer between said anode and cathode;

(d) removing said first and second inert liquid solvents; and (e) placing an electrolyte solution comprising an electrolyte solvent and an inorganic salt into said anode, cathode, and polymeric layer.

11. The method of claim 10 wherein the anode mixture, cathode mixture, and polymeric layer each further comprises a plasticizer and said method further comprises the step of removing said plasticizer before step (e).

12. The method of claim 10 wherein the step of preparing the anode mixture comprises the steps of:

(i) mixing the first polymer and a portion of said first inert liquid solvent under low shear conditions;

(ii) mixing the intercalation carbon material and a portion of said first inert liquid solvent; and (iii) mixing the mixtures of steps (i) and (ii) under low shear conditions; and wherein the step of preparing the cathode mixture comprises the steps of:

(iv) mixing the first polymer and a portion of said second inert liquid solvent under low shear conditions;

(v) mixing the cathode active material and a portion of said first inert liquid solvent; and (vi) mixing the mixtures of steps (iv) and (v) under low shear conditions.

13. The method of claim 10 wherein the anode mixture, cathode mixture, and electrolyte composition each further comprises a plasticizer and said method further comprises the step of removing said plasticizer prior to step (e), wherein the step of preparing the anode mixture comprises the steps of:

(i) mixing the first polymer and a portion of said first inert liquid solvent under low shear conditions;

(ii) mixing the intercalation carbon material, plasticizer, and a portion of said first inert liquid solvent; and (iii) mixing the mixtures produced in steps (i) and (ii) under low shear conditions; and wherein the step of preparing the cathode mixture comprises the steps of:

(iv) mixing the first polymer and a portion of said second inert liquid solvent under low shear conditions;

(v) mixing the cathode active material, plasticizer, and a portion of said first inert liquid solvent; and (vi) mixing the mixtures produced in steps (iv) and (v) under low shear conditions.

14. The method of claim 10 wherein said first and second polymers comprise polyvinylidenedifluoride.

15. The method of claim 10 wherein said first and second solvents comprise acetone.

16. The method of claim 11 wherein said plasticizer comprises dibutyl phthalate.

17. The method of claim 10 wherein each of said anode mixture and cathode mixture further comprise an electrically conductive material and a surfactant.

18. The method of claim 10 wherein the polymeric layer comprises polymeric matrix and third inert liquid solvent, said third inert liquid solvent being removed prior to step (e).

19. The method of claim 1 wherein said first and second polymers comprise a copolymer of polyvinylidenedifluoride and hexafluoropropylene.

20. The method of claim 10 wherein said first and second polymers comprise a copolymer of polyvinylidenedifluoride and hexafluoropropylene.

* * * * *